United States Patent
Hong

(10) Patent No.: US 12,277,145 B2
(45) Date of Patent: Apr. 15, 2025

(54) METHOD AND APPARATUS FOR CONSTRUCTING ENTITY RELATIONSHIP GRAPH, DEVICE AND STORAGE MEDIUM

(71) Applicant: Beijing Hydrophis Network Technology Co., Ltd., Beijing (CN)

(72) Inventor: Feng Hong, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/599,670

(22) Filed: Mar. 8, 2024

(65) Prior Publication Data

US 2024/0386036 A1 Nov. 21, 2024

(30) Foreign Application Priority Data

May 16, 2023 (CN) .......................... 202310547723.2

(51) Int. Cl.
*G06F 16/00* (2019.01)
*G06F 16/28* (2019.01)
*G06F 16/35* (2019.01)

(52) U.S. Cl.
CPC ............ *G06F 16/288* (2019.01); *G06F 16/35* (2019.01)

(58) Field of Classification Search
None
See application file for complete search history.

(56) References Cited

U.S. PATENT DOCUMENTS

| | | | |
|---|---|---|---|
| 10,255,275 B2* | 4/2019 | Song | G06F 40/55 |
| 10,388,274 B1* | 8/2019 | Hoffmeister | G06N 3/044 |
| 2016/0364377 A1* | 12/2016 | Krishnamurthy | G06F 40/35 |
| 2018/0032930 A1* | 2/2018 | Kolb | G06F 40/253 |
| 2020/0293720 A1* | 9/2020 | Tu | G06N 3/045 |
| 2022/0035692 A1* | 2/2022 | Wang | G06Q 10/04 |
| 2023/0267285 A1* | 8/2023 | Wu | G06F 40/166 704/2 |
| 2023/0306205 A1* | 9/2023 | Maeder | G06F 16/3344 |
| 2024/0086815 A1* | 3/2024 | Galow | G06F 16/358 |
| 2024/0386036 A1* | 11/2024 | Hong | G06F 16/35 |

FOREIGN PATENT DOCUMENTS

| CN | 114757541 A | * | 7/2022 | |
|---|---|---|---|---|
| CN | 110263178 B | * | 5/2023 | G06F 16/36 |

* cited by examiner

*Primary Examiner* — Hasanul Mobin

(57) ABSTRACT

The present disclosure relates to the technical field of information retrieval, and discloses a method for constructing an entity relationship graph, including: performing entity recognition and an operation of uniting like terms on the text to be processed to obtain a standard text entity set; performing grammatical structure analysis on the text to be processed, to obtain a grammatical relationship graph; selecting the node connected to the connection edge in the grammatical relationship graph as a target connection node and performing vector conversion to obtain a text vector, and analyzing a text entity relationship between the target connection nodes according to the text vectors; constructing a knowledge graph according to the standard text entities and the text entity relationship to obtain the entity relationship graph corresponding to the text to be processed. The present disclosure can improve the accuracy of the text entity relationship graph.

17 Claims, 3 Drawing Sheets

METHOD AND APPARATUS FOR CONSTRUCTING ENTITY RELATIONSHIP GRAPH, DEVICE AND STORAGE MEDIUM

CROSS REFERENCE TO RELATED APPLICATIONS

The present application claims the benefit of Chinese Patent Application No. 202310547723.2 filed on May 16, 2023, the contents of which are incorporated herein by reference in their entirety.

TECHNICAL FIELD

The present disclosure relates to the technical field of artificial intelligence, and more particularly to a method and apparatus for constructing an entity relationship graph, an electronic device and a computer-readable storage medium.

BACKGROUND

With the continuous development of information technology, various web pages, social media and other on-line content are also increasingly flourishing. How to obtain knowledge from a mass of unstructured text data and summarize same into image information is an urgent problem to be solved.

The existing knowledge acquisition methods are generally traditional information retrieval methods. According to the retrieval words provided by the user, the text related to the retrieval content is acquired from the text information. The image data summarized are often various flat document views, whereby the entities in the text and the relationship between the entities cannot be discovered, and little effect is provided for the user. In this case, it is required to extract the text entities in the text information and to construct the entity relationship graph thereby.

SUMMARY

The present disclosure provides a method and apparatus for constructing an entity relationship graph and a computer-readable storage medium, and its main object is to improve the accuracy of the text entity relationship graph.

In order to achieve the above-mentioned object, the present disclosure provides a method for constructing an entity relationship graph, including:
  acquiring a text to be processed, performing entity recognition on the text to be processed to obtain an initial text entity set, and performing an operation of uniting like terms on text entities in the initial text entity set to obtain a standard text entity set;
  performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;
  successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and
  constructing a knowledge graph according to the standard text entity and the text entity relationship to obtain the entity relationship graph corresponding to the text to be processed.

Optionally, the performing an operation of uniting like terms on text entities in the initial text entity set to obtain a standard text entity set includes:
  performing reference classification on initial text entities of the initial text entity set to obtain a reference entity and a non-reference entity having a reference feature in the initial text entity set;
  acquiring context information about each reference entity in the text to be processed;
  calculating an association degree between each reference entity and any non-reference entity in the initial text entity set according to the context information; and
  replacing the reference entity with the non-reference entity corresponding to the association degree satisfying a pre-set uniting condition to obtain the standard text entity set.

Optionally, the constructing a knowledge graph according to the standard text entity and the text entity relationship to obtain the entity relationship graph corresponding to the text to be processed includes:
  constructing triad data according to the standard text entity and the text entity relationship;
  storing the triad data as knowledge graph data into a pre-set graph database, and performing data completion on the triad data via the text to be processed to obtain standard triad data; and
  based on the pre-set graph database, constructing the knowledge graph via the standard triad data to obtain the entity relationship graph of the standard text entity.

Optionally, the performing entity recognition on the text to be processed includes:
  performing word segmentation on the text to be processed to obtain a word segmentation set;
  searching a part-of-speech set corresponding to each word segmentation in the word segmentation set from a pre-set grammar dictionary;
  acquiring context semantic information about each word segmentation in the text to be processed, and screening a part of speech in accordance with the context semantic information from the part-of-speech set as the part of speech of the corresponding word segmentation;
  determining the part of speech having a mapping relationship with an entity as a target part of speech according to a pre-set mapping relationship between the part of speech and the entity; and
  taking word segmentation corresponding to the target part of speech as an initial text entity of the text to be processed, and collecting all the initial text entities to obtain the initial text entity set.

Optionally, the analyzing the text entity relationship between the target connection nodes according to the text vectors and a pre-set entity relationship label list includes:
  utilizing a pre-set activation function to calculate the text vector so as to acquire a probability value between the text vector and each entity relationship label in the pre-set entity relationship label list; and
  selecting the entity relationship label with a maximum probability value as the text entity relationship between the target connection nodes.

Optionally, the utilizing a pre-set activation function to calculate the text vector so as to acquire a probability value between the text vector and each entity relationship label in the pre-set entity relationship label list includes that:

the text vector is calculated using the following activation function:

$$p(a \mid x) = \frac{\exp(w_a^T)}{\sum_{i=1}^{A} \exp(w_i^T)}$$

wherein p (a|x) is a relative probability between the text vector X and the entity relationship label a, $w_a$ is a weight vector of the entity relationship label a, $w_i$ is a weight vector of an $i^{th}$ entity relationship label, T is a transpose operation symbol, exp is an expectation operation symbol, and A is a quantity of entity relationship labels in the entity relationship label list.

Optionally, the graph database is a Neo4j graph database storing the knowledge graph data.

In order to solve the above-mentioned problem, the present disclosure provides an apparatus for constructing an entity relationship graph, the apparatus including:

a text entity recognition module configured for acquiring a text to be processed, performing entity recognition on the text to be processed to obtain an initial text entity set, and performing an operation of uniting like terms on text entities in the initial text entity set to obtain a standard text entity set;

a grammatical relationship graph construction module configured for performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;

an entity relationship analysis module configured for successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and an entity relationship graph construction module configured for constructing a knowledge graph according to the standard text entity and the text entity relationship to obtain the entity relationship graph corresponding to the text to be processed.

In order to solve the above-mentioned problem, the present disclosure provides an electronic device, the electronic device including:

at least one processor; and a memory in communication connection to the at least one processor, wherein the memory stores a computer program executable by the at least one processor, the computer program being executed by the at least one processor to enable the at least one processor to perform the method for constructing an entity relationship graph described above.

In order to solve the above-mentioned problems, the present disclosure also provides a computer-readable storage medium having stored therein at least one computer program to be executed by a processor in the electronic device to implement the method for constructing an entity relationship graph described above.

The embodiments of the present disclosure eliminate same entities by uniting like terms on the obtained entities in the text to be processed, so as to avoid the repeated occurrence of the same entity in the constructed entity relationship graph, affecting the accuracy of the entity relationship graph. A grammatical relationship graph between standard text entities is generated first, and then the relationship between entities is searched according to the grammatical relationship graph between standard text entities, so that the entity relationship between entities is more vivid, which is beneficial for searching for the entity relationship between standard text entities.

BRIEF DESCRIPTION OF THE ACCOMPANYING DRAWINGS

The realization of objects, functional features and advantages of the present disclosure will be further described with reference to the accompanying drawings in conjunction with the embodiments.

DETAILED DESCRIPTION OF ILLUSTRATED EMBODIMENTS

It should be understood that the particular embodiments described herein are illustrative only and are not restrictive.

An embodiment of the present application provides a method for constructing an entity relationship graph. The performing subject of the method for constructing an entity relationship graph includes, but is not limited to, at least one of a server end, a terminal end or other electronic device which can be configured to perform the method provided by the embodiment of the present application. In other words, the method for constructing an entity relationship graph may be performed by software or hardware installed on a terminal device or a service-end device, and the software may be a block chain platform. The service end includes but is not limited to: a single server, a server cluster, a cloud-end server or a cloud-end server cluster, etc. The server can be an independent server, and can also be a cloud server providing basic cloud computing services, such as a cloud service, a cloud database, cloud computing, a cloud function, cloud storage, a network service, cloud communication, a middleware service, a domain name service, a security service, a content delivery network (CDN), and a big data and artificial intelligence platform.

Figure 1:
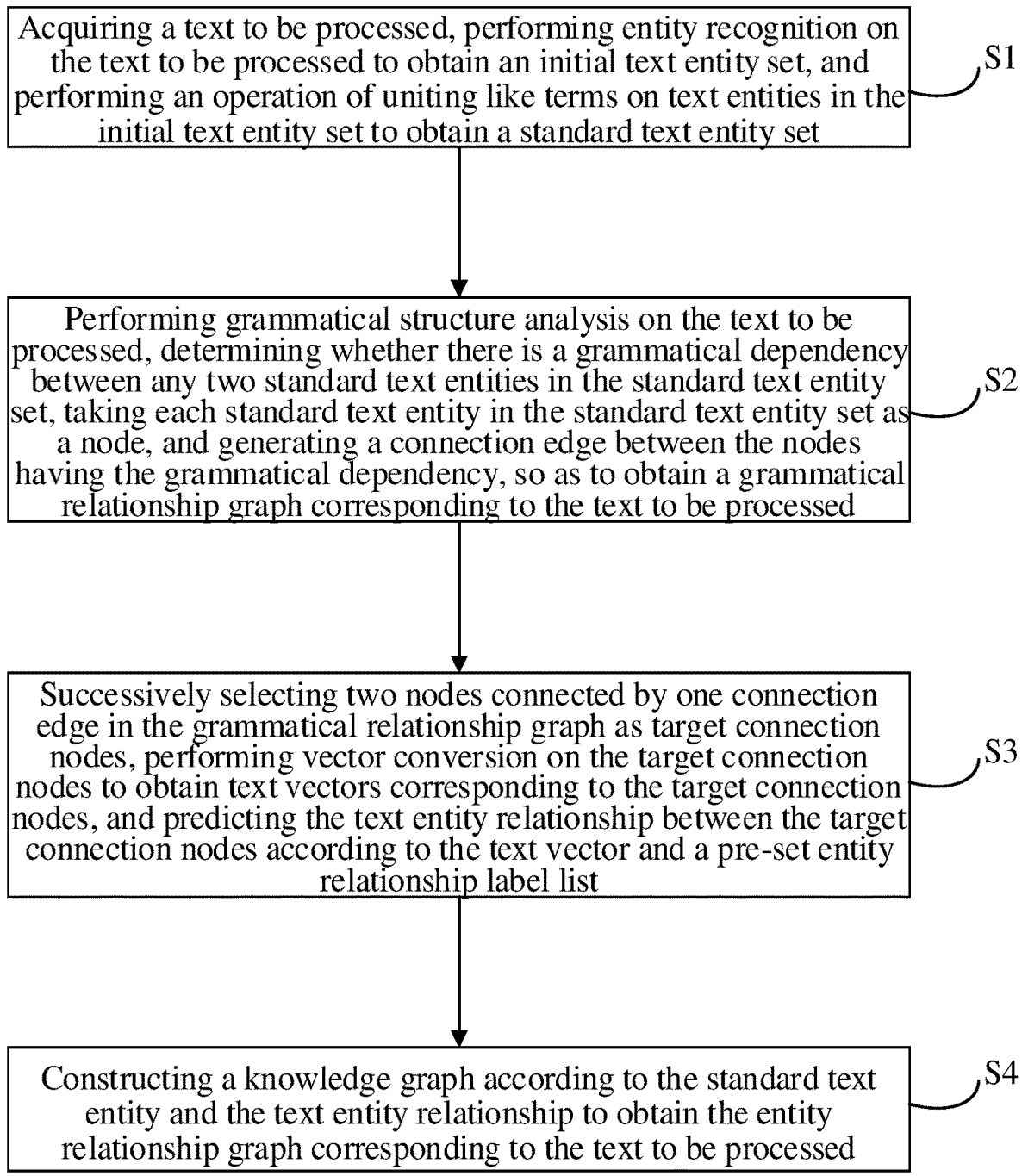
FIG. 1 is a schematic flow diagram of a method for constructing an entity relationship graph provided by an embodiment of the present disclosure.

Reference is made to FIG. 1, which is a schematic flow diagram of a method for constructing an entity relationship graph provided by an embodiment of the present disclosure.

In the present embodiment, the method for constructing an entity relationship graph includes that:

S1 a text to be processed is acquired, entity recognition is performed on the text to be processed to obtain an initial text entity set, and an operation of uniting like terms is performed on text entities in the initial text entity set to obtain a standard text entity set.

In an embodiment of the present disclosure, the text to be processed is a text information wherein it is required to extract an entity and acquire an internal entity of the text to be processed and an entity relationship. The text to be processed can be personnel management information of a company, and by taking each employee in the company as an entity, a relationship between each employee is constructed so as to obtain personnel organizational framework information of the company. Further, the text to be processed may also be textual information such as news articles, legal instruments, medical records, etc.

In an embodiment of the present disclosure, the initial text entity set can be obtained by obtaining a plurality of text entities contained in the text to be processed through a named entity recognition method. The named entity recognition method comprises a named entity recognition method based on a rule and a dictionary, a named entity recognition method based on machine learning and a named entity recognition method based on deep learning.

Illustratively, the text to be processed may be subjected to entity parsing by a named entity recognition method based on a rule and a dictionary, including: using a feature word and an external dictionary to construct an entity dictionary, and formulating an entity search rule, according to the entity search rule, searching for a word matching with the text to be processed from the entity dictionary, and collecting the matched words to obtain the initial text entity set.

In another embodiment of the present disclosure, the entity recognition may be performed on the text to be processed via the following method, including:

performing word segmentation on the text to be processed to obtain a word segmentation set;

searching a part-of-speech set corresponding to each word segmentation in the word segmentation set from a pre-set grammar dictionary;

acquiring context semantic information about each word segmentation in the text to be processed, and screening a part of speech in accordance with the context semantic information from the part-of-speech set as the part of speech of the corresponding word segmentation;

determining the part of speech having a mapping relationship with an entity as a target part of speech according to a pre-set mapping relationship between the part of speech and the entity; and taking word segmentation corresponding to the target part of speech as an initial text entity of the text to be processed, and collecting all the initial text entities to obtain the initial text entity set.

In the above-mentioned embodiments of the present disclosure, the pre-set grammar dictionary stores a large number of words and part-of-speech information corresponding to each word. Determining the part of speech corresponding to each word segmentation can be referred to as part-of-speech tagging, grammar tagging or word class disambiguation; performing part-of-speech tagging on the text to be processed can lay the foundation for extracting information from the text subsequently; it can be understood that one word segment may correspond to different parts of speech in different texts, namely, one word segmentation may have a plurality of parts of speech; and screening the part-of-speech set corresponding to the word segmentation according to the context semantic information about each word segmentation in the text to be processed can ensure the accuracy of the part(s) of speech corresponding to each word segmentation.

In another embodiment of the present disclosure, the text to be processed may also be annotated with parts of speech using a statistical-based part-of-speech annotation algorithm.

In the embodiments of the present disclosure, the mapping relationship between the pre-set part of speech and entity refers to pre-planning according to actual business requirements. For example, generally, nouns and pronouns refer to specific entities.

It will be appreciated that in the initial text entity set, the same text entity may be repeated a plurality of times, for example, a text entity such as Ms. Zhang Xiaoyi, Ms. Xiaoyi, Ms. Zhang, a department manager, and her may refer to the same object, and therefore, it is necessary to perform an operation of uniting like terms on the text entities in the initial text entity set so as to ensure that the text entities contained in the standard text entity set do not repeat.

Figure 2:
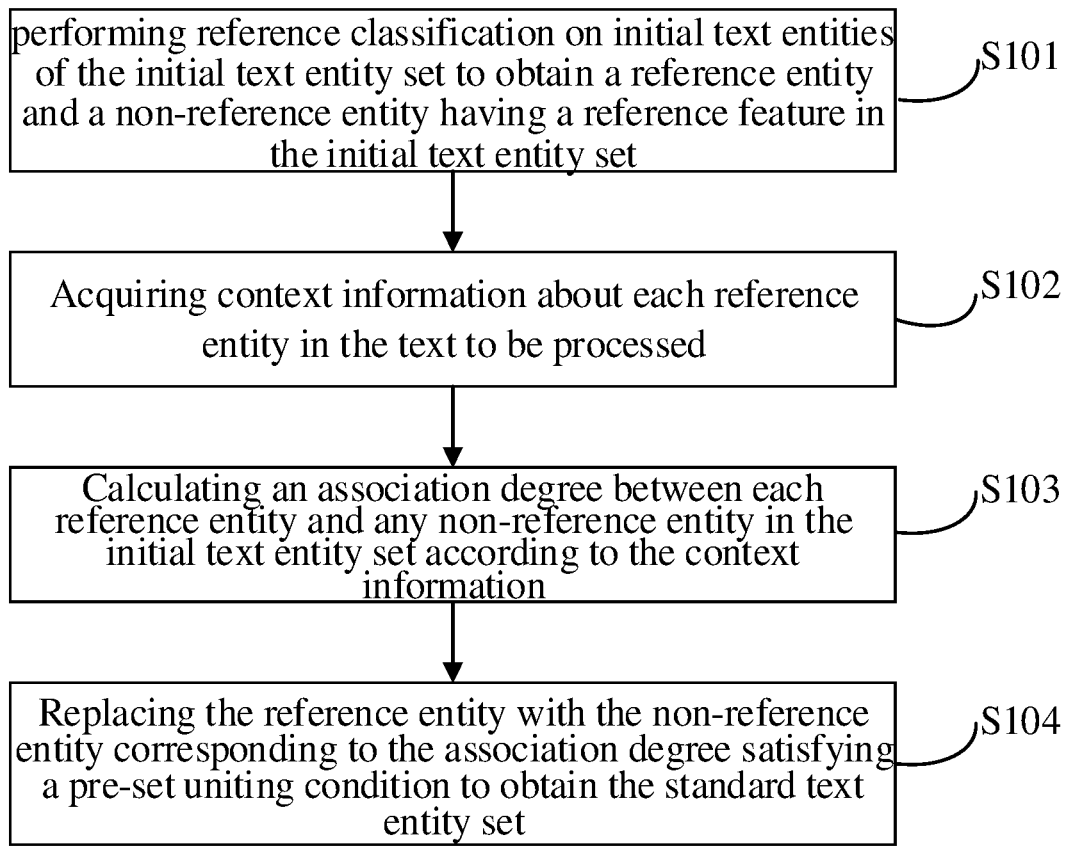
FIG. 2 is a detailed implementation schematic flow diagram of one of the steps in the method for constructing an entity relationship graph shown in FIG. 1.

With reference to FIG. 2, in an embodiment of the present disclosure, the performing an operation of uniting like terms on text entities in the initial text entity set to obtain a standard text entity set includes:

S101, performing reference classification on initial text entities of the initial text entity set to obtain a reference entity and a non-reference entity having a reference feature in the initial text entity set;

S102, acquiring context information about each reference entity in the text to be processed;

S103, calculating an association degree between each reference entity and any non-reference entity in the initial text entity set according to the context information; and S104, replacing the reference entity with the non-reference entity corresponding to the association degree satisfying a pre-set uniting condition to obtain the standard text entity set.

In an embodiment of the present disclosure, the pre-set uniting condition includes deeming two or more initial text entities corresponding to the association degree as the same text entity when the association degree is greater than a pre-set association degree threshold value, wherein the pre-set association degree threshold value can be set according to actual service requirements.

In another embodiment of the present disclosure, semantic recognition can be performed on the text to be processed, the initial text entity set is clustered based on a result of semantic recognition to obtain a plurality of clusters, the initial text entity corresponding to a clustering center of each cluster is selected as a standard text entity, and all the standard text entities are collected to obtain the standard text entity set.

S2, grammatical structure analysis is performed on the text to be processed, it is determined whether there is a grammatical dependency between any two standard text entities in the standard text entity set, each standard text entity in the standard text entity set is taken as a node, and a connection edge between the nodes having the grammatical dependency is generated, so as to obtain a grammatical relationship graph corresponding to the text to be processed In an embodiment of the present disclosure, if a change in one text entity affects another text entity, a grammatical dependency exists between the two text entities.

Specifically, the grammatical relationship graph is a graphical representation method for representing the grammatical structure of the text, through which the grammatical structure in the text can be more clearly understood. The grammatical relationship graph can be applied to various fields such as text classification, information extraction, text summarization, question and answer system, etc.

In an embodiment of the present disclosure, the grammatical dependency between the standard text entities may be acquired by constructing a dependency tree of the standard text entities.

The dependency tree is a graphical representation method for representing grammatical dependencies between entities in a sentence in syntactic analysis technology, and represents dependencies between words in a sentence in the form of a tree, wherein a root node of the tree represents a core meaning of the whole sentence, other nodes represent words, and edges represent grammatical dependencies between words. Common dependency tree representation tools include Stanford Parser, Google SyntaxNet, SpaCy, etc.

S3, two nodes connected by one connection edge in the grammatical relationship graph are successively selected as target connection nodes, vector conversion is performed on the target connection nodes to obtain text vectors corresponding to the target connection nodes, and the text entity relationship between the target connection nodes is analyzed according to the text vectors and a pre-set entity relationship label list.

In the embodiment of the present disclosure, the text entity relationship is a business relationship between any one or two standard text entities of the text to be processed. For example, in the personnel organizational framework information of a company, a person A may be an ordinary employee of a certain part or may be a leader of a certain part, and therefore, the entity of "employee A" may be associated with a plurality of other employee entities due to the existence of business relationships such as "colleague", "leader" and "subordinate".

In an embodiment of the present disclosure, the analyzing the text entity relationship between the target connection nodes according to the text vectors and a pre-set entity relationship label list includes:

utilizing a pre-set activation function to calculate the text vector so as to acquire a probability value between the text vector and each entity relationship label in the pre-set entity relationship label list; and selecting the entity relationship label with a maximum probability value as the text entity relationship between the target connection nodes.

In detail, the activation function includes, but is not limited to, a softmax activation function, a sigmoid activation function, and a relu activation function, and the entity relationship label in the pre-set entity relationship label list includes, but is not limited to, a colleague relationship, a superior-inferior relationship, an employment relationship, etc.

In one embodiment of the disclosure, a relative probability value may be calculated using the activation function as follows:

$$p(a \mid x) = \frac{\exp(w_a^T)}{\sum_{i=1}^{A} \exp(w_i^T)}$$

wherein p (a|x) is a relative probability between the text vector X and the entity relationship label a, $w_a$ is a weight vector of the entity relationship label a, $w_i$ is a weight vector of an $i^{th}$ entity relationship label, T is a transpose operation symbol, exp is an expectation operation symbol, and A is a quantity of entity relationship labels in the entity relationship label list.

In another embodiment of the present disclosure, the entity relationship between the target connection nodes can also be acquired through dependency propagation via a stacked graph neural network, wherein the stacked graph neural network is composed of a multi-granularity feature embedding layer, an LSTM-GCN encoding layer, a relationship perception multi-head attention layer, a densely connected graph neural network layer and a linear combination layer. The densely connected graph neural network may also be referred to as a graph convolution network (GCN).

S4, a knowledge graph is constructed according to the standard text entity and the text entity relationship to obtain the entity relationship graph corresponding to the text to be processed In an embodiment of the present disclosure, the knowledge graph is a structured semantic knowledge base for describing concepts of text entities and their interrelationships in symbolic form, the basic constituent unit of which is a triad of "entity-relation-entity".

Further, the standard text entities may be connected to each other via the text entity relationship to form a mesh structure.

In addition, the entity relationship graph can also be referred to as an ER graph or an entity contact pattern graph, which is represented in the form of a knowledge graph in the present solution.

Figure 3:
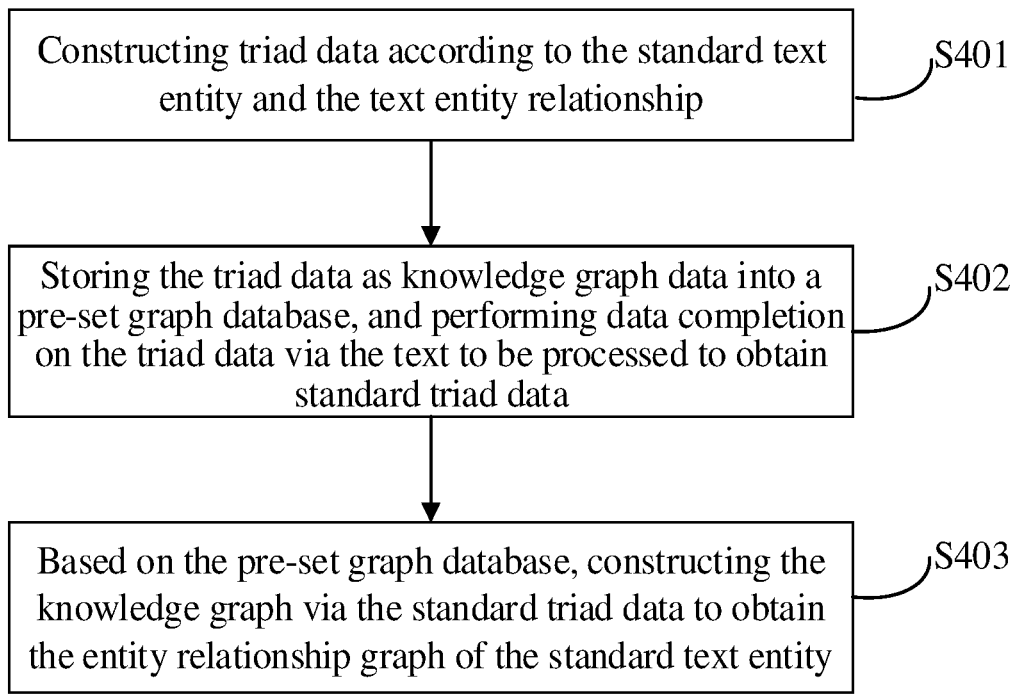
FIG. 3 is a detailed implementation schematic flow diagram of one of the steps in the method for constructing an entity relationship graph shown in FIG. 1.

With reference to FIG. 3, further, the constructing a knowledge graph according to the standard text entity and the text entity relationship to obtain the entity relationship graph corresponding to the text to be processed includes:

S401, constructing triad data according to the standard text entity and the text entity relationship;

S402, storing the triad data as knowledge graph data into a pre-set graph database, and performing data completion on the triad data via the text to be processed to obtain standard triad data; and S403, based on the pre-set graph database, constructing the knowledge graph via the standard triad data to obtain the entity relationship graph of the standard text entity.

Specifically, the pre-set graph database may be a common graph database storing knowledge graph data, for example, a Neo4j graph database.

Missing of entities in the text to be processed and entity relationships between entities can be avoided by performing data completion on the triad data, and in particular in the case where entity relationships between entities are not unique, overlapping triads can be mined by data completion. For example, in organizational framework information about a company pair, there is an inferior-superior relationship between a person B and a leader C, and there is also an employee-employer relationship between the person B and the leader C.

In an embodiment of the present disclosure, data completion may be performed on the triads via a rule-based method, a vector representation-based method and a deep learning method, for example, a knowledge graph completion algorithm for models such as ranse, transh, transr and complex.

The embodiments of the present disclosure eliminate same entities by uniting like terms on the obtained entities in the text to be processed, so as to avoid the repeated occurrence of the same entity in the constructed entity relationship graph, affecting the accuracy of the entity relationship graph. A grammatical relationship graph between standard text entities is generated first, and then the relationship between entities is searched according to the grammatical relationship graph between standard text entities, so that the entity relationship between entities is more vivid, which is beneficial for searching for the entity relationship between standard text entities.

Figure 4:
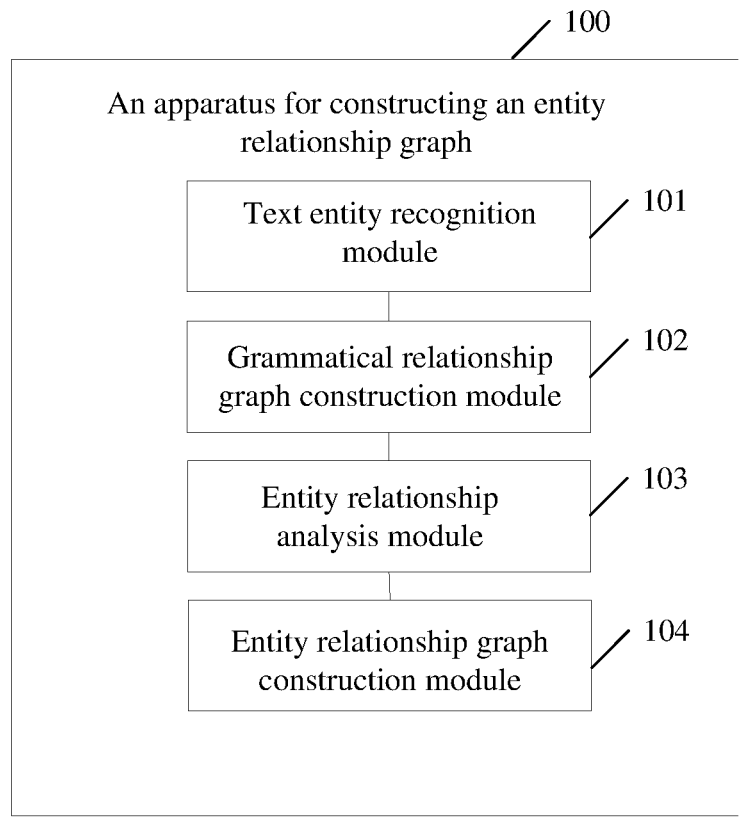
FIG. 4 is a functional module diagram of an apparatus for constructing an entity relationship graph provided by an embodiment of the present disclosure.

FIG. 4 shows a functional module diagram of an apparatus for constructing an entity relationship graph provided by an embodiment of the present disclosure.

The apparatus for constructing an entity relationship graph 100 of the present disclosure can be installed in an electronic device. According to the implemented functions, the apparatus for constructing an entity relationship graph 100 may include a text entity recognition module 101, a grammatical relationship graph construction module 102, an entity relationship analysis module 103, and an entity relationship graph construction module 104. A module of the present disclosure, which may also be referred to as a unit, refers to a series of computer program segments capable of being executed by the processor of the electronic device and capable of performing fixed functions, which are stored in the memory of the electronic device.

In the present embodiment, the functions of each module/unit are provided as follows that:

the text entity recognition module 101 is configured for acquiring a text to be processed, performing entity recognition on the text to be processed to obtain an initial text entity set, and performing an operation of uniting like terms on text entities in the initial text entity set to obtain a standard text entity set;

the grammatical relationship graph construction module 102 is configured for performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;

the entity relationship analysis module 103 is configured for successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and the entity relationship graph construction module 104 is configured for constructing a knowledge graph according to the standard text entity and the text entity relationship to obtain the entity relationship graph corresponding to the text to be processed.

In detail, the various modules described in the apparatus for constructing an entity relationship graph 100 in the embodiment of the present disclosure adopts the same technical means as the method for constructing an entity relationship graph described in the above-mentioned FIGS. 1 to 3 and can produce the same technical effect, and will not be described in detail here.

Figure 5:
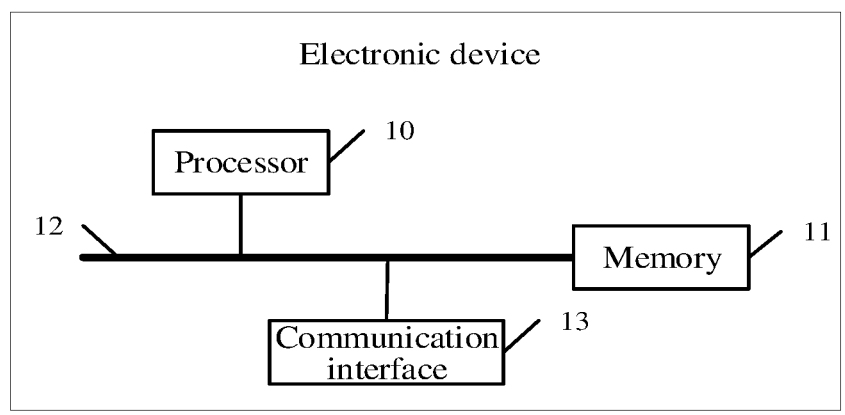
FIG. 5 is a schematic structural diagram of an electronic device implementing the method for constructing an entity relationship graph provided by an embodiment of the present disclosure.

FIG. 5 shows a schematic structural diagram of an electronic device implementing the method for constructing an entity relationship graph provided by an embodiment of the present disclosure.

The electronic device 1 may include a processor 10, a memory 11, a communication bus 12 and a communication interface 13, and may further include a computer program, such as a program for constructing an entity relationship graph, stored in the memory 11 and executable on the processor 10.

The processor 10 may, in some embodiments, be comprised of an integrated circuit, such as a single packaged integrated circuit, or a plurality of integrated circuits packaged with the same or different functions, including one or more central processing units (CPU), microprocessors, digital processing chips, graphics processors, combinations of various control chips, and the like. The processor 10 is a control unit of the electronic device, connects various components of the entire electronic device using various interfaces and lines, and performs various functions of the electronic device and processes data by running or executing the programs or modules stored in the memory 11 (for example, executing the program for constructing an entity relationship graph, etc.), and calls data stored in the memory 11.

The memory 11 includes at least one type of readable storage medium, and the readable storage medium includes a flash memory, a mobile hard disk, a multimedia card, a card-type memory (for example: SD or DX memory, etc.), a magnetic memory, a magnetic disk, an optical disk, etc. The memory 11 may in some embodiments be an internal storage unit of the electronic device, such as a mobile hard disk of the electronic device. The memory 11 may in other embodiments also be an external storage device of the electronic device, such as a plug-in mobile hard disk, a smart media card (SMC), a secure digital (SD) card, a flash card, etc. provided on the electronic device. Further, the memory 11 may include both the internal storage unit and the external storage device of the electronic device. The memory 11 may be configured not only for storing an application software installed in the electronic device and various types of data, such as codes of the program for constructing an entity relationship graph, but also for temporarily storing data that has been output or is to be output.

The communication bus 12 may be a peripheral component interconnect (PCI) bus or an extended industry standard architecture (EISA) bus or the like. The bus may be divided into an address bus, a data bus, a control bus, etc. The bus is provided to enable connection communication between the memory 11 and the at least one processor 10 etc.

The communication interface 13 is configured for communication between the electronic device and other devices, including a network interface and a user interface. Alternatively, the network interface may include a wired interface and/or a wireless interface (e.g. a WI-FI interface, a Bluetooth interface, etc.), typically for establishing the communication connection between the electronic device and other electronic devices. The user interface may be a display, an input unit (such as a keyboard), optionally a standard wired interface, a wireless interface. Alternatively, in some embodiments, the display may be an LED display, a liquid crystal display, a touch-sensitive liquid crystal display, an OLED (organic light-emitting diode) touchpad, or the like. Where appropriate, the display may also be referred to as a display screen or a display unit for displaying information processed in the electronic device and for displaying a visualized user interface.

FIG. 5 only shows the electronic device with components, while it is understood by a person skilled in the art that the structure shown in FIG. 5 does not constitute a limitation to the electronic device 1 and may include fewer or more components than shown, or some components in combination, or a different arrangement of components.

For example, although not shown, the electronic device may also include a power source (e.g. a battery) for powering the various components. Preferably, the power source may be logically connected to the at least one processor 10 via power source management means so that functions of charging management, discharging management, and power consumption management are realized via the power source management means. The power source may also include one or more of a direct current or alternating current power source, a recharging device, a power source failure detection circuit, a power source converter or an inverter, a power source status indicator, and any other component. The electronic device may further include various sensors, bluetooth modules, Wi-Fi modules, etc. which will not be described in detail herein.

It should be understood that the embodiments are for illustrative purposes only and are not to be construed as limiting the scope of the patent application into this structure.

The program for constructing an entity relationship graph stored in the memory 11 in the electronic device 1 is a combination of a plurality of instructions, and when running in the processor 10, can realize:

acquiring a text to be processed, performing entity recognition on the text to be processed to obtain an initial text entity set, and performing an operation of uniting like terms on text entities in the initial text entity set to obtain a standard text entity set;

performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;

successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and constructing a knowledge graph according to the standard text entity and the text entity relationship to obtain the entity relationship graph corresponding to the text to be processed.

In particular, for the specific implementation method of the above-described instruction by the processor 10, reference can be made to the description of the relevant steps in the corresponding embodiments of the accompanying drawings, which will not be repeated here.

Further, the integrated modules/units of the electronic device 1, if implemented in the form of software functional units and sold or used as stand-alone products, may be stored in a computer-readable storage medium. The computer-readable storage medium can be volatile or non-volatile. For example, the computer-readable medium may include: any entity or device, recording medium, U disk, mobile hard disk, magnetic disk, optical disk, computer memory, read-only memory (ROM), capable of carrying the computer program codes.

The present disclosure also provides a computer-readable storage medium having stored thereon a computer program, wherein the computer program, when executed by a processor of an electronic device, implements the steps of:

acquiring a text to be processed, performing entity recognition on the text to be processed to obtain an initial text entity set, and performing an operation of uniting like terms on text entities in the initial text entity set to obtain a standard text entity set;

performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;

successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and constructing a knowledge graph according to the standard text entity and the text entity relationship to obtain the entity relationship graph corresponding to the text to be processed.

In several embodiments provided by the present disclosure, it should be understood that the disclosed device, apparatus and method may be implemented in other ways. For example, the apparatus embodiments described above are merely illustrative. For example, the partitioning of the modules is merely a logical function partitioning, and additional partitioning manner may be adopted in practical implementations.

The modules illustrated as separate components may or may not be physically separated, and the components shown as modules may or may not be physical units, namely, may be located in one place, or may also be distributed over a plurality of network elements. Some or all of the modules therein may be selected to achieve the object of the solution of the present embodiment according to actual needs.

In addition, various functional modules in various embodiments of the present disclosure may be integrated in one processing unit, or various units may be physically separately provided, or two or more units may be integrated in one unit. The above-mentioned integrated units can be implemented in the form of hardware or in the form of hardware plus software functional module.

It will be evident to those skilled in the art that the present disclosure is not limited to the details of the foregoing illustrative embodiments, and that the present disclosure may be embodied in other specific forms without departing from the spirit or essential characteristics thereof.

The embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced by the present disclosure. Any reference signs in the claims shall not be construed as limiting the claim concerned.

The block chain referred to in the present disclosure is a new application mode of distributed data storage, point-to-point transmission, authentication mechanism, encryption algorithm and other computer technologies. A block chain, essentially a decentralized database, is a string of data blocks generated in association using cryptographic methods, each data block containing information about a batch of network transactions for verifying the validity of the information (anti-counterfeiting) and generating the next block. A block chain may include a block chain underlying platform, a platform product service layer, and an application service layer, etc.

Embodiments of the present application may obtain and process relevant data based on artificial intelligence techniques. Among them, artificial intelligence (AI) is a theory, method, technology and application system that uses a digital computer or digital computer-controlled machine to simulate, extend and expand human intelligence, perceive the environment, acquire knowledge and use the knowledge to obtain the best results.

Furthermore, it will be understood that the word "comprise" does not exclude other elements or steps and the singular does not exclude the plural. A plurality of the units or apparatuses recited in the system claims may also be embodied by one unit or apparatus via software or hardware. The terms first, second, etc. are used to refer to names and do not denote any particular order.

Finally, it should be noted that the above-mentioned embodiments are merely illustrative of the technical solution of the present disclosure, and are not restrictive. Although the present disclosure has been described in detail with reference to the foregoing preferred embodiments, those skilled in the art will appreciate that the technical solutions of the present disclosure can be amended or replaced with equivalents without departing from the spirit and scope of the technical solutions of the present disclosure.

What is claimed is:

1. A method for constructing an entity relationship graph, the method comprising:
    acquiring a text to be processed, performing entity recognition on the text to be processed to obtain an initial text entity set, and performing an operation of uniting like terms on text entities in the initial text entity set to obtain a standard text entity set;
    performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;
    successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and
    constructing a knowledge graph according to the standard text entity and the text entity relationship to obtain the entity relationship graph corresponding to the text to be processed;

wherein the performing entity recognition on the text processing comprises:
    performing word segmentation on the text to be processed to obtain a word segmentation set;
    searching a part-of-speech set corresponding to each word segmentation in the word segmentation set from a pre-set grammar dictionary;
    acquiring context semantic information about each word segmentation in the text to be processed, and screening a part of speech in accordance with the context semantic information from the part-of-speech set as the part of speech of the corresponding word segmentation;
    determining the part of speech having a mapping relationship with an entity as a target part of speech according to a pre-set mapping relationship between the part of speech and the entity; and
    taking word segmentation corresponding to the target part of speech as an initial text entity of the text to be processed, and collecting all the initial text entities to obtain the initial text entity set.

2. The method for constructing an entity relationship graph according to claim 1, wherein the performing an operation of uniting like terms on text entities in the initial text entity set to obtain a standard text entity set comprises:
    performing reference classification on initial text entities of the initial text entity set to obtain a reference entity and a non-reference entity having a reference feature in the initial text entity set;
    acquiring context information about each reference entity in the text to be processed;
    calculating an association degree between each reference entity and any non-reference entity in the initial text entity set according to the context information; and
    replacing the reference entity with the non-reference entity corresponding to the association degree satisfying a pre-set uniting condition to obtain the standard text entity set.

3. The method for constructing an entity relationship graph according to claim 1, wherein the constructing a knowledge graph according to the standard text entity and the text entity relationship to obtain the entity relationship graph corresponding to the text to be processed comprises:
    constructing triad data according to the standard text entity and the text entity relationship;
    storing the triad data as knowledge graph data into a pre-set graph database, and performing data completion on the triad data via the text to be processed to obtain standard triad data; and
    based on the pre-set graph database, constructing the knowledge graph via the standard triad data to obtain the entity relationship graph of the standard text entity.

4. The method for constructing an entity relationship graph according to claim 1, wherein the analyzing the text entity relationship between the target connection nodes according to the text vectors and a pre-set entity relationship label list comprises:
    utilizing a pre-set activation function to calculate the text vector so as to acquire a probability value between the text vector and each entity relationship label in the pre-set entity relationship label list; and
    selecting the entity relationship label with a maximum probability value as the text entity relationship between the target connection nodes.

5. The method for constructing an entity relationship graph according to claim 4, wherein the utilizing a pre-set activation function to calculate the text vector so as to acquire a probability value between the text vector and each entity relationship label in the pre-set entity relationship label list comprises that:

the text vector is calculated using the following activation function:

$$p(a\mid x) = \frac{\exp(w_a^T)}{\sum_{i=1}^{A}\exp(w_i^T)}$$

wherein p (a|x) is a relative probability between the text vector x and the entity relationship label a, $w_a$ is a weight vector of the entity relationship label a, $w_i$ is a weight vector of an $i^{th}$ entity relationship label, T is a transpose operation symbol, exp is an expectation operation symbol, and A is a quantity of entity relationship labels in the entity relationship label list.

6. The method for constructing an entity relationship graph according to claim 1, wherein the graph database is a Neo4j graph database storing the knowledge graph data.

7. An electronic device, the electronic device comprising:
at least one processor; and
a memory in communication connection to the at least one processor, wherein the memory stores a computer program executable by the at least one processor, the computer program being executed by the at least one processor to enable the at least one processor to perform the steps of:
acquiring a text to be processed, performing entity recognition on the text to be processed to obtain an initial text entity set, and performing an operation of uniting like terms on text entities in the initial text entity set to obtain a standard text entity set;
performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;
successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and
constructing a knowledge graph according to the standard text entity and the text entity relationship to obtain the entity relationship graph corresponding to the text to be processed;
wherein the performing entity recognition on the text processing comprises:
performing word segmentation on the text to be processed to obtain a word segmentation set;
searching a part-of-speech set corresponding to each word segmentation in the word segmentation set from a pre-set grammar dictionary;
acquiring context semantic information about each word segmentation in the text to be processed, and screening a part of speech in accordance with the context semantic information from the part-of-speech set as the part of speech of the corresponding word segmentation;
determining the part of speech having a mapping relationship with an entity as a target part of speech according to a pre-set mapping relationship between the part of speech and the entity; and
taking word segmentation corresponding to the target part of speech as an initial text entity of the text to be processed, and collecting all the initial text entities to obtain the initial text entity set.

8. The electronic device according to claim 7, wherein the performing an operation of uniting like terms on text entities in the initial text entity set to obtain a standard text entity set comprises:
performing reference classification on initial text entities of the initial text entity set to obtain a reference entity and a non-reference entity having a reference feature in the initial text entity set;
acquiring context information about each reference entity in the text to be processed;
calculating an association degree between each reference entity and any non-reference entity in the initial text entity set according to the context information; and
replacing the reference entity with the non-reference entity corresponding to the association degree satisfying a pre-set uniting condition to obtain the standard text entity set.

9. The electronic device according to claim 7, wherein the constructing a knowledge graph according to the standard text entity and the text entity relationship to obtain the entity relationship graph corresponding to the text to be processed comprises:
constructing triad data according to the standard text entity and the text entity relationship;
storing the triad data as knowledge graph data into a pre-set graph database, and performing data completion on the triad data via the text to be processed to obtain standard triad data; and
based on the pre-set graph database, constructing the knowledge graph via the standard triad data to obtain the entity relationship graph of the standard text entity.

10. The electronic device according to claim 7, wherein the analyzing the text entity relationship between the target connection nodes according to the text vectors and a pre-set entity relationship label list comprises: utilizing a pre-set activation function to calculate the text vector so as to acquire a probability value between the text vector and each entity relationship label in the pre-set entity relationship label list; and selecting the entity relationship label with a maximum probability value as the text entity relationship between the target connection nodes.

11. The electronic device according to claim 10, wherein the utilizing a pre-set activation function to calculate the text vector so as to acquire a probability value between the text vector and each entity relationship label in the pre-set entity relationship label list comprises that:
the text vector is calculated using the following activation function:

$$p(a\mid x) = \frac{\exp(w_a^T)}{\sum_{i=1}^{A}\exp(w_i^T)}$$

wherein p (a|x) is a relative probability between the text vector x and the entity relationship label a, $w_a$ is a weight vector of the entity relationship label a, $w_i$ is a weight vector of an $i^{th}$ entity relationship label, T is a transpose operation symbol, exp is an expectation operation symbol, and A is a quantity of entity relationship labels in the entity relationship label list.

12. The electronic device according to claim 7, wherein the graph database as a basis is a Neo4j graph database storing the knowledge graph data.

13. A non-volatile computer-readable storage medium having stored thereon a computer program, the computer program, when executed by a processor, implementing the steps of:
   acquiring a text to be processed, performing entity recognition on the text to be processed to obtain an initial text entity set, and performing an operation of uniting like terms on text entities in the initial text entity set to obtain a standard text entity set;
   performing grammatical structure analysis on the text to be processed, determining whether there is a grammatical dependency between any two standard text entities in the standard text entity set, taking each standard text entity in the standard text entity set as a node, and generating a connection edge between the nodes having the grammatical dependency, so as to obtain a grammatical relationship graph corresponding to the text to be processed;
   successively selecting two nodes connected by one connection edge in the grammatical relationship graph as target connection nodes, performing vector conversion on the target connection nodes to obtain text vectors corresponding to the target connection nodes, and analyzing the text entity relationship between the target connection nodes according to the text vectors and a pre-set entity relationship label list; and
   constructing a knowledge graph according to the standard text entity and the text entity relationship to obtain the entity relationship graph corresponding to the text to be processed-;
   wherein the performing entity recognition on the text processing comprises:
   performing word segmentation on the text to be processed to obtain a word segmentation set;
   searching a part-of-speech set corresponding to each word segmentation in the word segmentation set from a pre-set grammar dictionary:
   acquiring context semantic information about each word segmentation in the text to be processed, and screening a part of speech in accordance with the context semantic information from the part-of-speech set as the part of speech of the corresponding word segmentation;
   determining the part of speech having a mapping relationship with an entity as a target part of speech according to a pre-set mapping relationship between the part of speech and the entity; and
   taking word segmentation corresponding to the target part of speech as an initial text entity of the text to be processed, and collecting all the initial text entities to obtain the initial text entity set.

14. The non-volatile computer-readable storage medium according to claim 13, wherein the performing an operation of uniting like terms on text entities in the initial text entity set to obtain a standard text entity set comprises:
   performing reference classification on initial text entities of the initial text entity set to obtain a reference entity and a non-reference entity having a reference feature in the initial text entity set;
   acquiring context information about each reference entity in the text to be processed;
   calculating an association degree between each reference entity and any non-reference entity in the initial text entity set according to the context information; and
   replacing the reference entity with the non-reference entity corresponding to the association degree satisfying a pre-set uniting condition to obtain the standard text entity set.

15. The non-volatile computer-readable storage medium according to claim 13, wherein the constructing a knowledge graph according to the standard text entity and the text entity relationship to obtain the entity relationship graph corresponding to the text to be processed comprises:
   constructing triad data according to the standard text entity and the text entity relationship;
   storing the triad data as knowledge graph data into a pre-set graph database, and performing data completion on the triad data via the text to be processed to obtain standard triad data; and
   based on the pre-set graph database, constructing the knowledge graph via the standard triad data to obtain the entity relationship graph of the standard text entity.

16. The non-volatile computer-readable storage medium according to claim 13, wherein the analyzing the text entity relationship between the target connection nodes according to the text vectors and a pre-set entity relationship label list comprises:
   utilizing a pre-set activation function to calculate the text vector so as to acquire a probability value between the text vector and each entity relationship label in the pre-set entity relationship label list; and
   selecting the entity relationship label with a maximum probability value as the text entity relationship between the target connection nodes.

17. The non-volatile computer-readable storage medium according to claim 16, wherein the utilizing a pre-set activation function to calculate the text vector so as to acquire a probability value between the text vector and each entity relationship label in the pre-set entity relationship label list comprises that:
   the text vector is calculated using the following activation function:

$$p(a \mid x) = \frac{\exp(w_a^T)}{\sum_{i=1}^{A} \exp(w_i^T)}$$

wherein p (a|x) is a relative probability between the text vector x and the entity relationship label a, $w_a$ is a weight vector of the entity relationship label a, $w_i$ is a weight vector of an $i^{th}$ entity relationship label, T is a transpose operation symbol, exp is an expectation operation symbol, and A is a quantity of entity relationship labels in the entity relationship label list.

* * * * *